United States Patent
Venkatachalam et al.

(10) Patent No.: US 8,280,417 B2
(45) Date of Patent: Oct. 2, 2012

(54) SHORT USER MESSAGES IN SYSTEM CONTROL SIGNALING

(75) Inventors: Muthaiah Venkatachalam, Beaverton, OR (US); Pouya Taaghol, San Jose, CA (US); Shantidev Mohanty, Santa Clara, CA (US); Xiangying Yang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 206 days.

(21) Appl. No.: 12/646,708

(22) Filed: Dec. 23, 2009

(65) Prior Publication Data

US 2010/0279717 A1    Nov. 4, 2010

(51) Int. Cl.
H04B 7/00 (2006.01)
H04M 3/00 (2006.01)
H04W 4/00 (2009.01)

(52) U.S. Cl. .......................... 455/466; 455/70; 455/418

(58) Field of Classification Search .............. 455/69, 455/70, 72, 403, 418, 420, 446, 466, 456.1–456.3, 455/456.5–456.6, 511, 515, 517–519, 550.1, 455/556.2, 557–558, 560–561, 412.1–412.2, 455/415, 434, 500, 514, 551, 566–567; 370/300, 370/310, 312–313, 328, 348–349, 469, 473–474, 370/477, 913; 707/692, 695, 700–701
See application file for complete search history.

(56) References Cited

U.S. PATENT DOCUMENTS

| | | | |
|---|---|---|---|
| 5,903,726 A * | 5/1999 | Donovan et al. | 709/206 |
| 6,519,468 B1 * | 2/2003 | Donovan et al. | 455/466 |
| 7,072,359 B2 * | 7/2006 | Uchida et al. | 370/466 |
| 7,139,259 B2 * | 11/2006 | Qu et al. | 370/342 |
| 7,328,032 B2 | 2/2008 | Billing et al. | |
| 7,386,009 B2 | 6/2008 | Reddy et al. | |
| 7,474,660 B1 * | 1/2009 | Pearce et al. | 370/395.3 |
| 2002/0046280 A1 * | 4/2002 | Fujita | 709/227 |
| 2004/0179492 A1 * | 9/2004 | Zhang et al. | 370/331 |
| 2006/0089161 A1 * | 4/2006 | Kim et al. | 455/458 |
| 2006/0194581 A1 * | 8/2006 | Kang et al. | 455/436 |
| 2007/0218926 A1 * | 9/2007 | Zhuang et al. | 455/466 |
| 2007/0238474 A1 * | 10/2007 | Ballas et al. | 455/466 |
| 2008/0095092 A1 * | 4/2008 | Kim | 370/311 |

FOREIGN PATENT DOCUMENTS

| CN | 101202965 A * | 6/2008 |
|---|---|---|
| KR | 2002-0036356 | 5/2002 |

OTHER PUBLICATIONS

PCT Search Report, PCT/US2010/046527, mailing date May 2, 2011, Applicant Intel Corporation.

* cited by examiner

*Primary Examiner* — Meless Zewdu
(74) *Attorney, Agent, or Firm* — Blakely, Sokoloff, Taylor & Zafman LLP

(57) ABSTRACT

Short user messages can be conveyed in system management signaling for a data or telephony network. In one example, a first control message is sent from a first radio to a second radio, the control message including a data field, the data field containing a short message directed from a user of the first radio to a user of a third radio. In response, a second control message is received in reply to the first control message from the second radio, the second control message including a data field, the data field containing a response to the short message.

20 Claims, 4 Drawing Sheets

SHORT USER MESSAGES IN SYSTEM CONTROL SIGNALING

CROSS-REFERENCE TO RELATED APPLICATIONS

This application claims the priority of provisional application Ser. No. 61/175,266, filed Aug. 24, 2009, entitled ADVANCED BROADBAND WIRELESS COMMUNICATION SYSTEMS AND METHODS.

FIELD

The present description pertains to the field of short messages for wireless communications and, in particular, to communicating short messages using a portion of a control message.

BACKGROUND

Text messaging allows a cellular telephone or other wireless user device to transfer a text message to another cellular telephone or wireless device. It has become popular enough with cellular telephone users that laws have been passed to prohibit sending text messages while driving. Scientific research has been conducted to study the physical effects of text messaging on thumbs and the mental effects of text messaging on grammar and communication skills. For many radio communications systems, text messaging is supported through Short Message Services (SMS).

SMS supports text and sometimes other small data files. MMS (Multimedia Message Services) has been adopted to allow for larger data files, such as larger images and videos to be sent from one cellular telephone or other mobile device to another. The two systems operate using different messages that are a different part of the air interface.

With demands for faster transfers of more data and media-rich files, current wireless communications systems are moving to a fourth generation (4G). It appears that LTE (Long Term Evolution) and IEEE (Institute of Electrical and Electronics Engineers Standard) 802.16m will be among those with the greatest use worldwide.

BRIEF DESCRIPTION OF THE DRAWINGS

Embodiments of the present invention are illustrated by way of example, and not limitation, in the figures of the accompanying drawings in which like reference numbers are used to refer to like features, and in which.

DETAILED DESCRIPTION

In the connected mode, the MS can send RNG-REQ to a BS (Base Station) using all or a portion of the message's TLV to carry the short message. For receiving, the MS receives a RNG-RSP from the BS using the TLV to carry the short message. Other messages and control messages can be used depending on the application.

Figure 1:
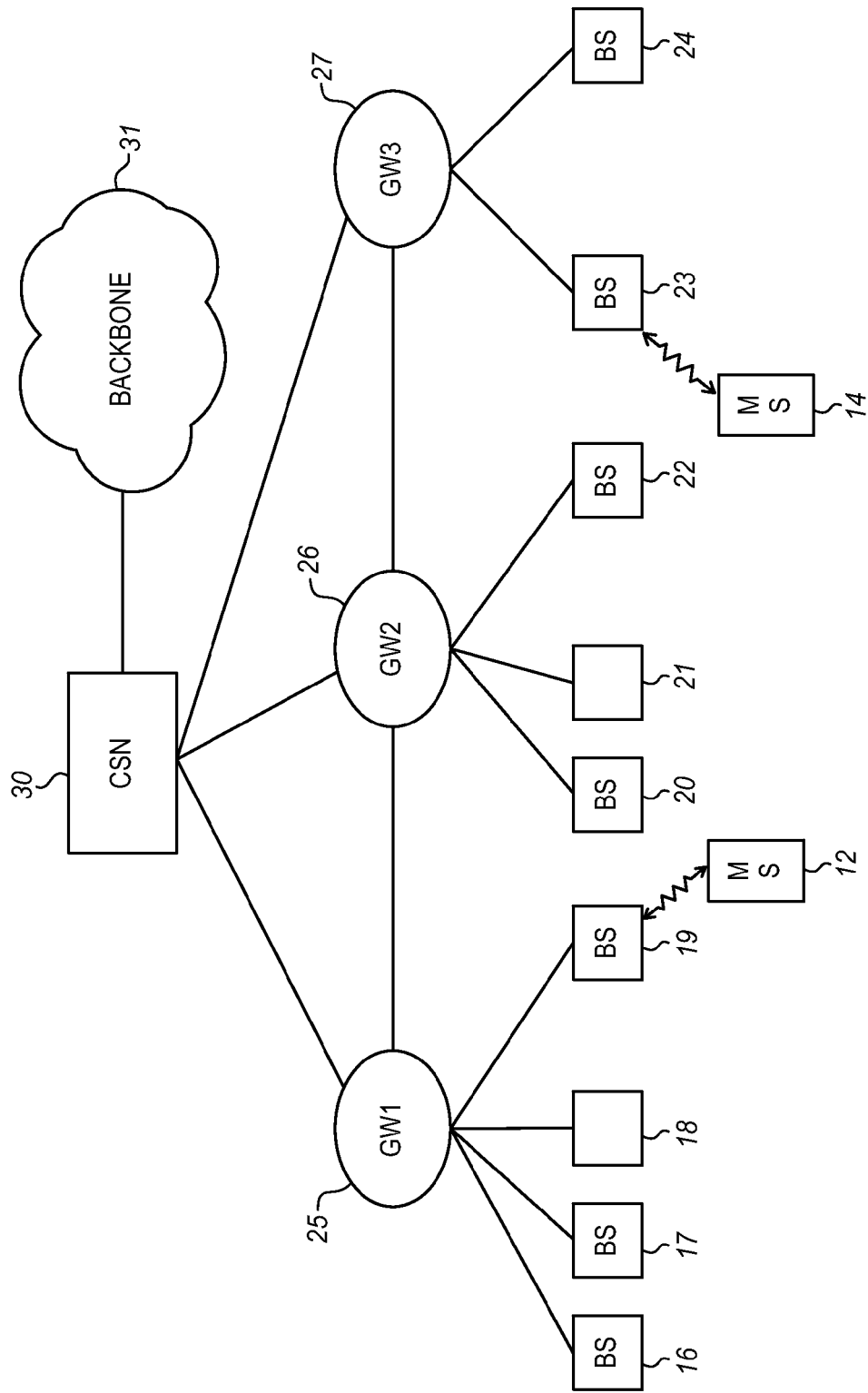
FIG. 1 is a diagram of a wireless radio system suitable for implementation of an embodiment of the present invention.

FIG. 1 shows an example of a cellular radio system 10. MSs 12, 14 can be mobile or fixed and can take the form of cellular telephones, netbooks, personal computers, media players, appliances, or any of a variety of other wireless connected devices. The MS can also be referred to as a subscriber station, remote station, terminal or by other terms.

A number of base stations (BS) 16-24 are provided in the system to provide connections for the MSs. The BS can take a variety of different forms and may cover large or small areas and transmit powers, depending on the application. While the BSs are shown as being similar in FIG. 1, they may be connected and configured differently from each other as well. In some applications, a network access point or an MS peer may act or function as a BS. In the illustrated example, the first MS is registered with a BS 19 and the second MS is registered with another BS 23. This registration allows each MS to communicate with the BS to support all of the services that the MS and the system support.

Each BS 16-24 is connected to a gateway (GW). There are three gateways 25, 26, 27. Each gateway supports several BSs. The gateways may or may not be connected to each other and are all connected directly or indirectly to a Connectivity Service Network (CSN) 30. There may be one or more CSNs in any one system. The CSN is coupled to a telephony or data network backbone 31 that provides access to other telephony systems, data servers and services and more. In some instances, a BS may be connected directly to the CSN through the backbone 31 instead of through a gateway.

In the illustrated example, system administration and management can be distributed between the BS, GW, and CSN in a variety of different ways. For communications, the first MS 12 can communicate with the second MS through the respective connected BS and GW. If both MS were registered at the same BS, the BS may be able to support communications without routing through the GW. Similarly, if the second MS were connected to another system, CSN or ISP (Internet Service Provider), then the two MSs can communicate through the backbone 31.

FIG. 1 shows one example network, however, the present invention can be applied to a wide range of different network configurations and communications can be routed differently to suit different situations and applications.

Figure 2:
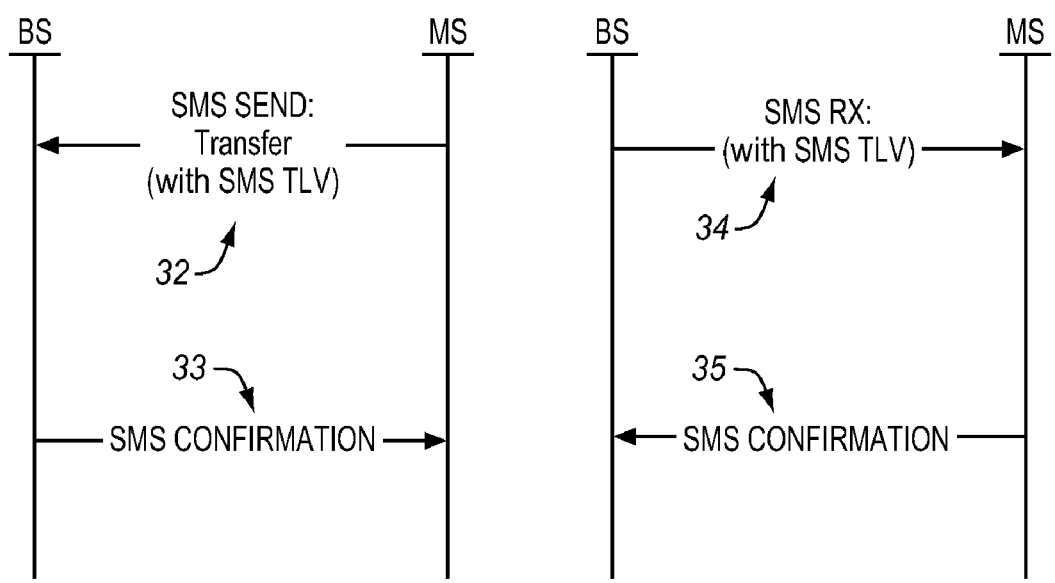
FIG. 2 is a signal diagram of receiving and transmitting SMS between a base station and a mobile station in a connected mode according to an embodiment of the present invention.

FIG. 2 shows an example of sending text messages or other types of short messages using L2 transfer mechanism. L2 transfer is a concept wherein the MAC control plane is used for transferring higher layer messages. In a WiMAX system this can be a L2 (Layer 2) transfer message such as L2-XFER. The L2 transfer uses a specific type and subtype to transfer the messaging payload (e.g.: Type 6, subtype a). Bandwidth may be negotiated in advance by the MS with the BS to send the messaging payload on the uplink using the L2 transfer mechanism.

The BS then provides an SMS confirmation 33. As with the initial message transfer an L2 transfer message can be used. The L2 transfer uses a specific type and subtype for the confirmation (e.g.: Type 6, subtype b).

Both of the transfer messages of FIG. 2 have been altered. Instead of carrying a control message intended for the base station the first transfer message 32 contains a text message or other short message intended for another user. A conventional L2-XFER has a type and subtype attributes. A specific "Type" such as Type 6 and a specific "SubType" such as a SubType is to be defined for carrying the short message. When there is a short message to be transferred, a TLV (Type length Value) or other field associated with the short message can be inserted in the L2-XFER control message. The data in this field can be replaced by a short message to the user and a marker, such as the Type and subtype fields, to indicate that the short message is a user message, not a control message.

In FIG. 2, the BS can also send SMS to the MS using L2-XFER messages. First, a L2-Xfer message 34 is sent to the MS. As with the L2-XFER from the MS, this message may contain a TLV field associated with a short message for the MS user with or without other control related TLV parameters. The TLV for SMS can be identified with any particular predefined type and subtype. Type 6, subtype a, for example can be used as with the transfer from the MS. Alternatively, in the connected mode, the BS can send a L2-XFER that includes a confirmation with a text to the MS user.

The MS answers the SMS from the BS with a confirmation message 35. This can also be in the form of an AAI_L2-XFER, of a specific Type and subtype (e.g.: Type 6, subtype b). The confirmation can also include another SMS. For the MS in a connected mode, the system may choose to use other MAC control messages such ranging or registration messages to transfer short messages. These messages can have a "Type" that is defined specifically for SMS or another user messaging protocol.

Figure 3:
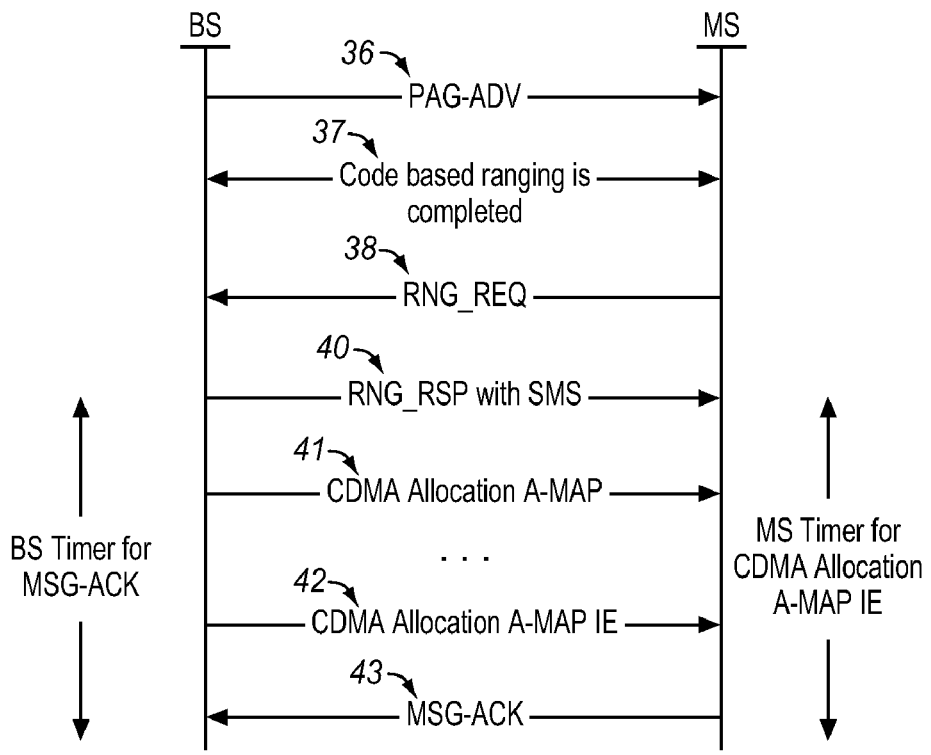
FIG. 3 is a signal diagram of receiving SMS at a mobile station from a base station in an idle mode according to an embodiment of the present invention.

In idle mode, the BS and MS are not connected to allow for the exchange of L2 transfer messages. In FIG. 3, the BS has a short message to send to the MS, but the MS is in idle mode. Accordingly, it will not receive a RNG-RSP as in FIG. 2. The BS sends a page 36 to the MS. In the illustrated example, the figure is an AAI_PAG-ADV with an action code of 0b01. This page is used to command the MS to do a location update. The stations first perform ranging 37 to request bandwidth from the BS. Then, the MS responds and begins the location update by sending a conventional RNG-REQ 38. In one example this can be a AAI_RNG-REQ on CDMA Allocation A-MAP IE (RAID1 and masking indicator for Ranging).

However, the BS does not reply with a conventional RNG-RSP. Instead, the MS receives a RNG-RSP 40 back from the BS that contains the SMS related TLV fields. As before this message may or may not also contain a control message. In the illustrated example, this is followed by the message 41 with CDMA Allocation A-MAP IE (RAID1 and masking indicator for Ranging). The BS continues to send this message 42 until it receives an acknowledgment 43 from the MS. Both the BS and MS can count timers until the acknowledgment is received. The MS has a timer for the CDMA Allocation A-MAP IE and the BS has a timer for the acknowledgment. As an alternative, the MS can instead send a ranging or other control message that includes SMS text in addition to the acknowledgment.

In one particular example as shown in FIG. 3, when a BS has a downlink SMS for an idle mode MS, the BS includes the SMS in an AAI_RNG-RSP message after sending an AAI_PAG-ADV indicating location update. After sending the AAI_RNG-RSP with SMS, the BS grants a CDMA Allocation A-MAP IE in an unsolicited manner in order to receive AAI_MSG-ACK as a confirmation for the downlink SMS. The MCRC of CDMA Allocation A-MAP IE is masked with a RAID and masking indicator for Ranging, where the RAID is the same as the RAID masked in CDMA Allocation A-MAP IE for the AAI_RNG-REQ message sent by the MS.

After the BS transmits the AAI_RNG-RSP with SMS, the aBS starts a timer SMS_confirm_resource_alloc_timer and grants the CDMA Allocation A-MAP IE to the MS. When the MS receives the AAI_RNG-RSP with SMS, the MS starts a timer SMS_confirm_resource_waiting_timer and waits for the CDMA Allocation A-MAP IE to send the AAI_MSG-ACK.

Figure 4:
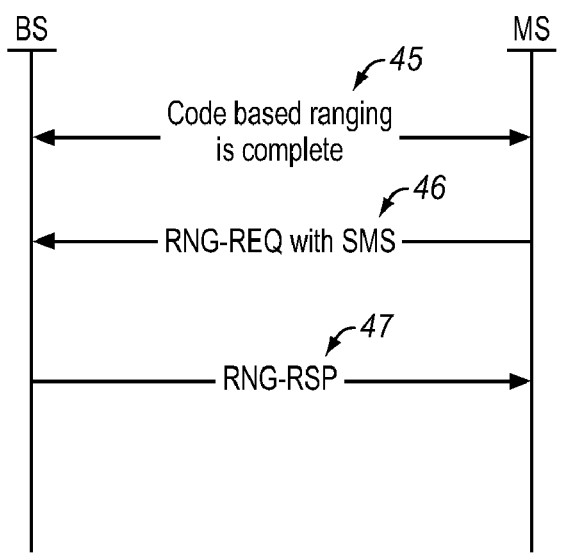
FIG. 4 is a signal diagram of sending SMS from a mobile station to a base station in an idle mode according to an embodiment of the present invention.

If the MS has data to send for a short message and the MS is in idle mode, then it can do an unsolicited location update using RNG-REQ 46 and include the SMS as part of it. This is shown in FIG. 4. In this example, code based ranging has been completed 45 so that the stations are ready to communicate. The ranging request signal can take the form of a AAI_RNG-REQ with SMS on CDMA Allocation A-MAP IE (RAID1 and masking indicator for Ranging). The base station can reply with a conventional RNG-RSP 47 or it can include a short message in its RNG-RSP, if it has a queued short message to send.

In one particular example, a BS uses an AAI_RNG-RSP message to transmit SMS to an MS in the downlink. An SMS from the MS in the idle state may be included in a AAI_RNG-REQ message. This can be indicated using, for example, a Ranging Purpose Indication Bit#1=1 ("idle mode location update"). If the uplink resource for the RNG-REQ message is not enough to send an AAI_RNG-REQ including the SMS, then the AAI_RNG-REQ may be fragmented using a RNG-REQ fragmentation method.

The BS receives the SMS from the MS while the MS is in its idle state through the AAI_RNG-REQ message. Upon receiving this, the BS can reply with an AAI_RNG-RSP message. This can be used as a confirmation of the SMS.

In prior systems, SMS and MMS are encrypted at the physical layer. This can be done when the messages are specifically configured to carry SMS or MMS. In 802.16m the RNG-REQ and RNG-RSP messages are not encrypted. The control messages typically carried in the TLV of a RNG message is not sensitive. This can be compensated for using an application layer, for example, an SMS layer encryption mechanism or applying encryption in another way. The higher level encryption can be used to encrypt the actual SMS portion carried by the TLV of the RNG message without the RNG message being encrypted at the physical layer.

In the 802.16 example discussed above the RNG messages are part of a group of MAC (Media Access Control) control messages.

These messages are carried in the Payload of a MAC PDU (Protocol Data Unit). All of the MAC Control messages begin with a Message Type field and may contain additional fields. The format of the control message is provided in Table 1 below.

TABLE 1

| Field | Size | Note |
| --- | --- | --- |
| Control Message Type | 8 | REQ = 4, RSP = 5 |
| Reserved | 8 | Value is zero |
| TLV Encoded Information | variable | Control Messages |

In Table 1, the first portion of a MAC PDU is a type indicator. 8 bits are allocated. For a RNG-REQ, the type is the number 4. For a RNG-RSP, the type is the number 5. Many more types of MAC PDU's are accommodated using other type numbers. The next 8 bits of the message are zeroes. After this header, the MAC PDU contains the TLV data. As described below the TLVs can be of different sizes or lengths and can be combined in a single message in the manners that are specifically allowed. The TLV are intended to be control messages that are transparent to the user and ensure smooth operation of the system.

In 802.16m, ranging using RNG-REQ and RNG-RSP is the process of acquiring the correct timing offset, frequency offset and power adjustments so that the transmissions of the MS are aligned with the BS, and so that they are received within the appropriate reception thresholds. Ranging is also used to establish the location of a mobile station as it moves from place to place.

The ranging messages are used to maintain the quality of the radio communications link at the physical layer. Different messages are used for the uplink and the downlink although the basic structure is the same. Ranging allows the system to adjust time and frequency synchronization and the power and assignments for subcarriers and subchannels. Ranging is done periodically for the various supported carriers between each base station and registered mobile station.

The ranging messages are a part of the basic messages for the system. Separate and apart from the broadcast channel and subscriber registration, ranging messages are directed to a specific registered MS and the specific BS to which the MS is registered. Separate and apart from the traffic channels, the basic messages handle control information and system configuration.

The Ranging Request (RNG-REQ) message is transmitted by the MS at initialization and periodically to determine network delay and to request a change in transmit power, downlink burst profiles, or other system operation parameters. Initialization refers to when the MS originally seeks to gain access to the network and register with a base station. The RNG-REQ message may be sent in initial ranging and data grant intervals. The TLV field portion of the message is varied depending on the circumstances and there can be more than one TLV fields in a single RNG-REQ message.

The TLV fields may encode information including burst profiles, MAC addresses, ranging anomalies, equipment capabilities and identifiers, base station identifiers, handover requests, network reentry requests, emergency call procedures, paging control messages, timing, delay, and retry parameters, power control and management messages, etc. All of these parameters are directed to the system and concern the identification or operation of the MS in the system. None of these messages involve information to be conveyed to users or to the application layer. Typically, a system tries to prevent a user from seeing these messages which would otherwise interfere with the user's attention on the information that he is sending to or receiving from other users.

The Ranging Response (RNG-RSP) message has similar types of TLV parameters that it can send. These can include timing adjustment Information, frequency, channel, subchannel, and delay assignments, various timers, slot and frame numbers, equipment Nos. and addresses of base stations and modems, and paging parameters, etc. As with the request message, the TLVs for the response message also all relate to control parameters and equipment operation.

Using the TLV for messages between users allows short user messages to be transmitted at almost any time without changing the operational modes of the MS. The ranging messages present the advantage that they can be sent when no active connection is required and that they can be sent at almost any time. In order to accommodate such a function, the short user message is uniquely identified and both the BS and MS are adapted to identify the message and handle it accordingly.

The TLV is one example of an information encoding format. Embodiments of the invention may also be adapted for use with other encoding formats including ASN 1. In many of the described embodiments of the invention, the short user message is place in an optional field. The short user message can then either be included or not included without affecting other functions. In other words, using an optional field, when the message is parsed the present or absence of the short user message will not affect the parsing of the message.

Figure 5:
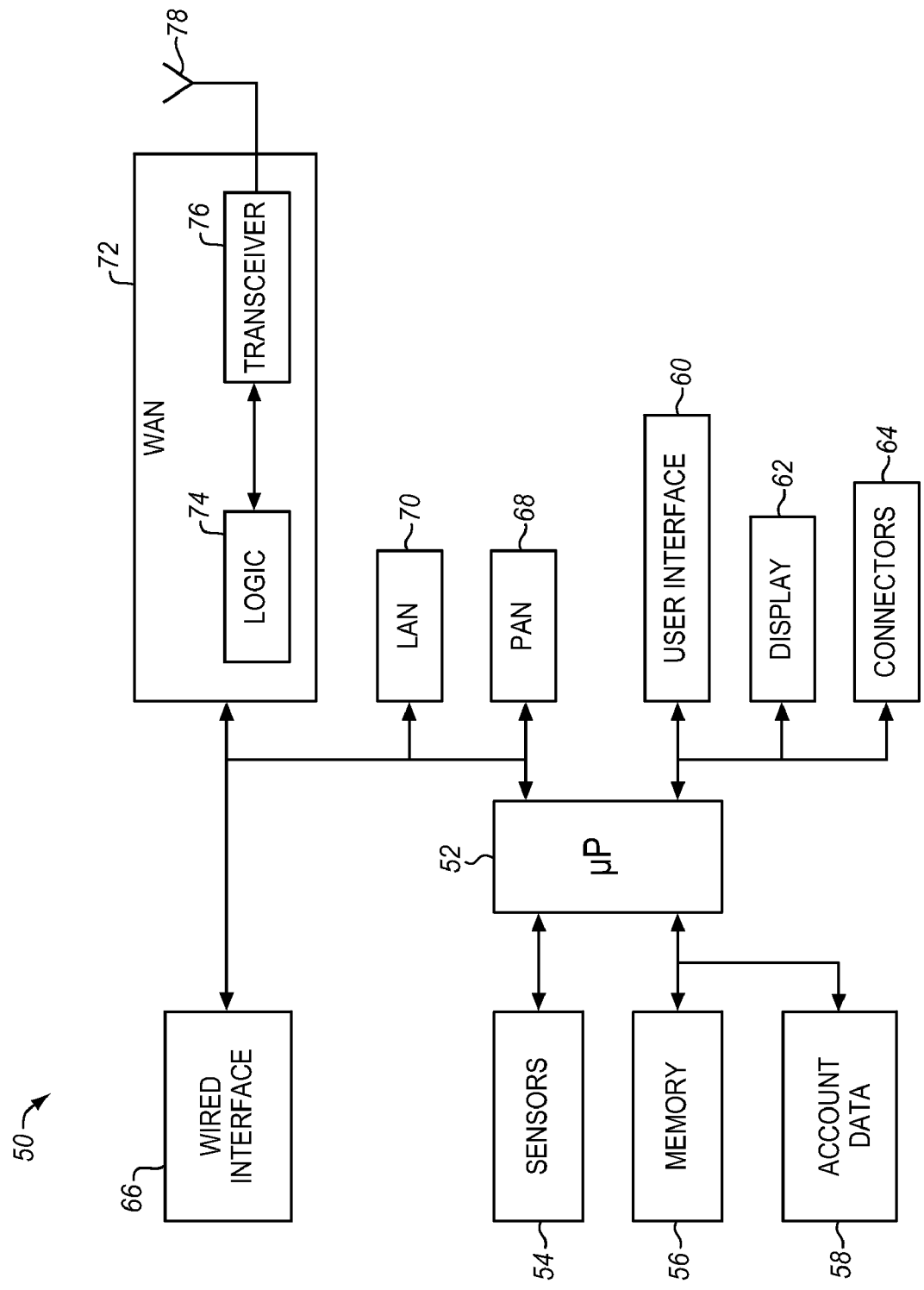
FIG. 5 is a block diagram of a mobile station or base station for implementing embodiments of the present invention.

FIG. 5 shows an example of a hardware configuration that can be used for both a base station and a mobile station to implement the communications described above. In FIG. 5, the station 50 is driven by a processor 52. This can be a small, low power processor in the case of a MS or a high power, high speed processor in the case of a BS.

The processor has a memory bus that is coupled to a memory 56, such as magnetic, optical, or solid state memory or some combination thereof. The memory contains programming instructions and user data that can be sent and received between stations. Account data 58 can also be connected to the bus. For the MS, this can include a SIM (Subscriber Identity Module) and other stored personal parameters. For the BS this can include account authorization databases or connections to such databases.

A suite of sensors 54, such as positioning sensors, battery or power sensors, cameras and microphones, and transceiver signal sensors are coupled to the processor to provide additional data to the processor.

A user interface bus, such as USB (Universal Serial Bus) or another type of user interface connection connects the processor to a user interface 60, such as a keyboard, touch screen, mouse, trackball, or other interface, a display 62, and other connectors 64 to allow other devices to be connected. The particular user interface can be adapted to suit the particular application. A user can enter or attach text or other short messages through the user interface and can use the interface for system maintenance and control. For a MS, the user can, through the interface, make recordings with the microphone and camera and attach them to short messages that are commanded to be sent to a specific user or group of users using the keyboard or touch screen.

The processor 52 is coupled to another communications bus for communications with other devices. A wired interface 66 allows a BS to communicate with other BS's, gateways, base station controllers, operations and maintenance centers, etc. For the BS, the wired interface can allow for network connections and for a portable device, it may allow the device to be coupled to a personal computer for updates and maintenance. The communications bus also provides for wired or wireless connections to a personal area network (PAN) 68, such as Bluetooth, a local area network (LAN) 70 such as Wi-Fi, and a wide area network 72, or metropolitan area network such as 802.16m. More or fewer network adapters may be provided, depending on the application. Some network functions may be consolidated or separated, and a variety of different communications protocols and configurations may be used.

The wide area network (WAN) adapter 72 includes logic 74 to generate, assemble, encode, encrypt, and queue packets to be sent through the WAN. The logic is coupled to a transceiver 76 to modulate, encode, and amplify the packets from the logic for transmission through an antenna 78 over the WAN. The antenna may have one or more elements, depending on performance, cost and design considerations. The same transmit chain can also function as a receive chain or a separate receive chain (not shown) can be used. The receive chain would perform the reciprocal functions of receiving demodulating, amplifying, parsing, decoding, etc. to obtain data to send back to the processor over the communications bus.

In the case of receiving a packet with control messages, the messages are sent to the processor and are then used to adjust operation parameters or call routines for registration, call initiation, etc. In the case of receiving a packet with a user message, the message is sent to the processor and is then provided to the user on the display. In either case, the messages may be stored in memory.

The configuration of FIG. 5 can also be applied to a portable or desktop computer equipped with a wireless adapter. The WAN adapter 72 can be provided as a separate component on USB, a PCI (Peripheral Component Interconnect) bus, or any other suitable bus, or it can be provided as an internal system component.

A lesser or more equipped communications station 50 than the example described above may be desirable for certain implementations. Therefore, the configuration of the system will vary from implementation to implementation depending upon numerous factors, such as price constraints, performance requirements, technological improvements, and/or other circumstances.

Embodiments of the present invention have been described in the context of 802.11m and particular messages within that communications protocol and standard, however, the invention is not so limited. Embodiments of the present invention can be applied to other communications protocol and other types of control messages within 802.16m and other protocols in order to allow short user messages to be transmitted with little impact on overall system operation. While the present description is in the context of SMS, it can be applied to any of a variety of different short user messages. In addition, while SMS is frequently transmitted from one cellular telephone to another, users can send texts using WiFi, Internet, and telephone-connected devices, including portable and desktop computers, telephones, and media players. A remote data terminal or remote terminal herein can refer to any such device.

While the steps described herein can be performed under the control of a programmed processor, such as the processor 52, in alternative embodiments, the steps can be fully or partially implemented by any programmable or hard coded logic, such as Field Programmable Gate Arrays (FPGAs), TTL logic, or Application Specific Integrated Circuits (ASICs), for example. Additionally, the method of the present invention can be performed by any combination of programmed general purpose computer components or custom hardware components. Therefore, nothing disclosed herein should be construed as limiting the present invention to a particular embodiment wherein the recited steps are performed by a specific combination of hardware components.

The present invention can be provided as a computer program product that can include a machine-readable medium having instructions stored thereon, which can be used to program a computer (or other machine) to perform a process according to the present invention. The machine-readable medium can include, but is not limited to, floppy diskettes, optical disks, CD-ROMs, and magneto-optical disks, ROMs, RAMs, EPROMs, EEPROMs, magnet or optical cards, flash memory, or any other type of medium suitable for storing electronic instructions.

In the present description, for the purposes of explanation, numerous specific details are set forth in order to provide a thorough understanding of the present invention. However, the present invention can be practiced without some of these specific details. In other instances, well-known structures and devices are shown in block diagram form. The specific detail can be supplied by one of average skill in the art as appropriate for any particular implementation.

Although this disclosure describes illustrative embodiments of the invention in detail, it is to be understood that the invention is not limited to the precise embodiments described.

The specification and drawings are, accordingly, to be regarded in an illustrative rather than a restrictive sense. Various adaptations, modifications and alterations may be practiced within the scope of the invention defined by the appended claims.

What is claimed is:

1. A method comprising:
    sending a first control message from a first radio to a second radio, the control message including a control message type to identify a type of media access control for the first control message, a data field, the data field containing a short message directed from a user of the first radio to a user of the second radio and a type identification to identify the contents of the data field as a short message;
    receiving a second control message in reply to the first control message from the second radio, the second control message including a control message type to identify a type of media access control for the second control message, a data field, the data field containing a response to the short message and a type identification to identify the contents of the data field as a short message.

2. The method of claim 1, wherein the reply is an acknowledgment of the short message.

3. The method of claim 1, wherein the reply is a second short message from a remote user to the user of the first radio.

4. The method of claim 1, wherein the second short message is from a user of a third radio.

5. The method of claim 1, wherein the short message is a text message.

6. The method of claim 1, wherein the short message is a short message service message.

7. The method of claim 1, wherein the short message is a multimedia message.

8. The method of claim 1, wherein the data field is assigned for use for the control message.

9. The method of claim 1, wherein the first control message is a media access control message.

10. The method of claim 1, wherein the media access control message is used for connected mode and idle mode media access control operations.

11. The method of claim 1, further comprising receiving a page from the second radio and wherein sending the first control message is in response to receiving the page.

12. The method of claim 9, wherein the first control message is a location update.

13. The method of claim 1, further comprising encrypting the short message at an application layer before sending.

14. The method of claim 1, wherein the response to the short message is encrypted, the method further comprising decrypting the response to the short message at an application layer.

15. An apparatus comprising:
    a processor to generate a control message, the control message including a control message type to identify a type of media access control for the first control message, a data field, the data field containing a short message directed from a user of a first radio to a user of a second radio and a type identification to identify the contents of the data field as a short message; and
    a transceiver to send the control message from the first radio to the second radio and to receive a second control message in reply to the first control message from the second radio, the second control message including a control message type to identify a type of media access control for the second control message, a data field, the data field containing a response to the short message and a type identification to identify the contents of data field as a short message.

16. The apparatus of claim 15, wherein the processor is further to encrypt the short message at an application layer before sending.

17. The apparatus of claim 15, wherein the data field is assigned for use for a control message.

18. A non-transitory machine-readable medium having instructions stored thereon that when operated on by the machine cause the machine to perform operations comprising:
sending a first control message from a first radio to a second radio, the control message including a control message type to identify a type of media access control for the first control message, a data field, the data field containing a short message directed from a user of the first radio to a user of a third radio and a type identification to identify the contents of data field as a short message;
receiving a second control message in reply to the first control message from the second radio, the second control message including a control message type to identify a type of media access control for the second control message, a data field, the data field containing a response to the short message and a type identification to identify the contents of the data field as a short message.

19. The medium of claim 18, the instructions further comprising receiving a page from the second radio and wherein sending the first control message is in response to receiving the page.

20. The medium of claim 19, wherein the first control message is a location update.

* * * * *